(12) United States Patent
Alkasrawi et al.

(10) Patent No.: US 11,077,435 B2
(45) Date of Patent: Aug. 3, 2021

(54) CATALYST AND METHOD FOR FRACTIONATING LIGNOCELLULOSIC MATERIAL

(71) Applicant: WiSys Technology Foundation, Inc., Madison, WI (US)

(72) Inventors: Malek Alkasrawi, Plover, WI (US); Joynal Abedin, Bothell, WA (US)

(73) Assignee: WiSys Technology Foundation, Inc., Madison, WI (US)

( * ) Notice: Subject to any disclaimer, the term of this patent is extended or adjusted under 35 U.S.C. 154(b) by 0 days.

(21) Appl. No.: 16/928,673

(22) Filed: Jul. 14, 2020

(65) Prior Publication Data

US 2020/0338541 A1     Oct. 29, 2020

Related U.S. Application Data

(62) Division of application No. 16/044,184, filed on Jul. 24, 2018, now Pat. No. 10,737,256.

(60) Provisional application No. 62/536,065, filed on Jul. 24, 2017.

(51) Int. Cl.

| | |
|---|---|
| *B01J 31/22* | (2006.01) |
| *B01J 31/28* | (2006.01) |
| *B01J 21/08* | (2006.01) |
| *B01J 35/00* | (2006.01) |
| *C13K 1/02* | (2006.01) |
| *B01J 37/04* | (2006.01) |
| *B01J 37/02* | (2006.01) |
| *C07G 1/00* | (2011.01) |
| *B01J 35/02* | (2006.01) |
| *B01J 31/16* | (2006.01) |
| *B01J 23/745* | (2006.01) |

(52) U.S. Cl.
CPC ........... *B01J 31/2295* (2013.01); *B01J 21/08* (2013.01); *B01J 31/1625* (2013.01); *B01J 31/2273* (2013.01); *B01J 31/28* (2013.01); *B01J 35/0006* (2013.01); *B01J 35/0013* (2013.01); *B01J 35/0033* (2013.01); *B01J 35/026* (2013.01); *B01J 37/0219* (2013.01); *B01J 37/0221* (2013.01); *B01J 37/04* (2013.01); *C07G 1/00* (2013.01); *C13K 1/02* (2013.01); *B01J 23/745* (2013.01); *B01J 2531/847* (2013.01)

(58) Field of Classification Search
None
See application file for complete search history.

(56) References Cited

U.S. PATENT DOCUMENTS

2019/0022632 A1    1/2019  Alkasrawi et al.

FOREIGN PATENT DOCUMENTS

CN           105885066 A    8/2016

OTHER PUBLICATIONS

"", An English translation CN 105885066 A, (2016).
"", An English translation CN 105885066 A , Part 2, (2016).
"U.S. Appl. No. 16/044,184, Notice of Allowance dated Apr. 1, 2020", 14 pgs.
"U.S. Appl. No. 16/044,184, Response filed Feb. 6, 2020 to Restriction Requirement dated Nov. 6, 2019", 7 pgs.
"U.S. Appl. No. 16/044,184, Restriction Requirement dated Nov. 6, 2019", 10 pgs.
Lu, Yu, et al., "Modifying the Surface Properties of Superparamagnetic Iron Oxide Nanoparticles through a Sol-Gel Approach", NANO Letters, vol. 2, No. 3, (2002), pp. 183-186.
Monge-Marcet, Amalia, et al., "Catalytic applications of recyclable silica immobilized NHCeruthenium complexes", Tetrahedron, 69, (2013), pp. 341-348.
Monge-Marcet, Amalia, et al., "Imidazolium-derived organosilicas for catalytic applications", Catalysis Science & Technology, vol. 1, No. 9, (Dec. 2011), pp. 1544-1563.
Revell, Jefferson D, et al., "Synthesis of Functionalized 1,5-Cyclooctadienes by LICKOR Metalation", Journal of Organic Chemistry, 67, (2002), pp. 6250-6252.
Ruffert, Christine, et al., "Investigations on the Separation of Platinum Nanoparticles With Magnetic Beads", IEEE Transactions on Magnetics, vol. 50, No. 11, (Nov. 2014), 4 pages.

*Primary Examiner* — Yun Qian
(74) *Attorney, Agent, or Firm* — Schwegman Lundberg & Woessner, P.A.

(57) ABSTRACT

Various embodiments disclosed relate to solid catalysts that convert lignocellulosic material to monomer sugars that are suitable for fermentation. The solid catalysts include a transition metal complex attached to a magnetic bead, and can be physically separated from a fermentation mixture and reused several times.

20 Claims, No Drawings

CATALYST AND METHOD FOR FRACTIONATING LIGNOCELLULOSIC MATERIAL

CROSS-REFERENCE TO RELATED APPLICATION

This application is a divisional of U.S. patent application Ser. No. 16/044,184, filed Jul. 24, 2018, which claims the benefit of priority to U.S. Provisional Patent Application Ser. No. 62/536,065 entitled "LIGNIN UPGRADE FOR HIGH CHEMICAL AND SUGAR PRODUCTION," filed Jul. 24, 2017, the disclosures of which are incorporated herein in their entirety by reference.

BACKGROUND

Over $2 \times 10^{11}$ metric tons of lignocellulosic material is produced by natural source annually. As feedstock, this material would provide theoretical energy of $3 \times 10^{18}$ kJ, which corresponds to ten times annual energy consumption of the entire world. In order to tap such energy resources, key technology must be developed, namely, that of improved production of green sugars for subsequent generation of green fuel and chemicals by biological conversion. Cellulosic ethanol became a reality in 2015, when several corn ethanol plants developed new "bolt-on" processes with multiple, onsite production lines for producing fuel and chemicals. (RFA, *Fueling a high octane future*. 2016, Renewable Fuels Association) Commercial cellulose-based sugar production was a turning point from process scale up and demonstration. However, lignocellulosic pretreatment, either by thermal or chemical means, is necessary to convert biomass so that it is accessible for enzymatic action. Unfortunately, current processes are complex and require high capital expenditure (CAPEX) and operational expenditures (OPEX). The need for a simple, economical conversion method is urgent.

Existing processes typically use homogenous acids, such as $H_2SO_4$ or HCl, and biological enzymes to convert lignocellulose into green sugars. However, these tools are burdened by many technical and economic problems.

There is a need to develop processes that will dramatically reduce the processing cost and time for converting lignocellulosic into fermentable sugars, thus providing an effective feedstock for biofuels and bio-based chemicals. Solid acid catalysts provide certain advantages and may permit cost of biofuel to reduce below that of petroleum-derived gasoline once implemented by biofuel producers based on lignocellulosic feedstock.

Several solid catalysts are known, such as acid resins, metal oxides, and zeolites, that fractionate cellulose into sugars and various oligomers. (Li et al., 2016; Hu et al., 2016; Rinaldo et al., 2010; Schneider et al., 2016) However, despite their potential, there is a dilemma with using solid acid catalysts. Specifically, solid acid catalysts have a problem of low substrate load (Schneider et al., 2016; Verma et al., 2014; Shuai et al., 2012), poor reaction mediums or low yields of specific mono sugars. (Hu et al., 2016; Rinaldi et al., 2010; Onda et al., 2008; Zhang et al., 2014) To date, typical cellulose loading has been limited to less than 15%. Additionally, some solid catalysts have a problem of low or no yield of mono sugars, for example, core-shell $Fe_3O_4@SiO_2$—$SO_3H$ acid catalyst reports high turnover of reducing sugars but no report of mono sugar hydrolysis.

Thus, there is a need for an improved method which more efficiently fractionates lignocellulosic material into green sugars and high value chemicals. The present disclosure describes a solution which solid phase catalyst that incorporates a transition metal complex and magnetic properties that can dramatically reduce the processing cost and time to create fermentable sugars from lignocellulosic biomass to produce biofuels and bio-based chemicals. The inventive catalysts can function under high cellulose load and have low catalyst loading requirements, while also producing monosaccharides.

Thus, there is a need for an improved method which more efficiently fractionates lignocellulosic material into green sugars and high value chemicals. The present disclosure describes a solution that dramatically reduces the processing cost and time to create fermentable sugars from lignocellulosic biomass, thus providing a green and economical feedstock for biofuel and bio-based chemical production.

SUMMARY OF THE INVENTION

The present invention provides a catalyst linked to a magnetic bead comprising iron oxide, the catalyst having the structure of Formula I.

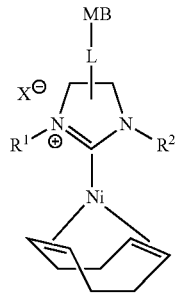

Formula I

In Formula I, X is a counterion, L is a linker group, MB is a metal-containing bead, and $R^1$ and $R^2$ are each independently chosen from $C_{1-10}$ alkyl, $C_{7-10}$ aralkyl, $C_6$-$C_{12}$ aryl, $C_{2-8}$ heterocyclyl, and combinations thereof, each of which may be optionally substituted, wherein at least a portion of the surface of the bead is uniformly coated with amorphous silica.

In some embodiments, a method of fractionation is provided. The method includes treating a lignin-containing and/or cellulose-containing composition with an effective amount of a catalyst that includes metal-containing bead linked to a transition metal complex to form a fractionated composition.

In some embodiments, the method of fractionation includes mechanically and chemically fractionating a cellulose-containing composition with a catalytic amount of the a catalyst that includes metal-containing bead linked to a transition metal complex to produce a fractionated composition having a liquid phase comprising monosaccharides and a solid phase, wherein the chemical fractionation includes selective cleavage of the β-1,4 glycosidic bonds of cellulose by the transition metal complex, the mechanical fractionation includes increasing the accessible surface area and pore size of the cellulose-containing composition; and magnetically separating a catalyst that includes metal-containing bead linked to a transition metal complex from the fractionated composition.

In some embodiments a method of making a transition metal complex is provided. The method includes reacting

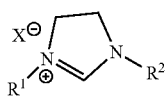

with a transition metal precursor in the presence a strong base and solvent to form a N-heterocyclic carbene complex.

Advantageously, in some embodiments, the same catalyst can be reused multiple times and can be conveniently recovered and isolated from a reaction mixture using a magnet. Advantageously, the catalyst functions under high cellulose loads of as much as 50%.

The present disclosure describes, in various embodiments, a method which has the advantage of dramatically reducing the processing cost and time to create fermentable sugars from lignocellulosic biomass. For example, in various embodiments, the fractionation can be performed directly on wood and other lignocellulosic materials without requiring a separate step to separate lignin. The present disclosure also describes, in various embodiments, catalysts which can function under high cellulose load and have low catalyst loading requirements, while also producing monosaccharides.

DETAILED DESCRIPTION OF THE INVENTION

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that the composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less. The term "substantially free of" can mean having a trivial amount of, such that a composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

The term "organic group" as used herein refers to any carbon-containing functional group. Examples can include an oxygen-containing group such as an alkoxy group, aryloxy group, aralkyloxy group, oxo(carbonyl) group; a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, C(=NOR)R, and substituted or unsubstituted (C$_1$-C$_{100}$)hydrocarbyl, wherein R can be hydrogen (in examples that include other carbon atoms) or a carbon-based moiety, and wherein the carbon-based moiety can be substituted or unsubstituted.

The term "substituted" as used herein in conjunction with a molecule or an organic group as defined herein refers to the state in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{100}$)hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "acyl" as used herein refers to a group containing a carbonyl moiety wherein the group is bonded via the carbonyl carbon atom. The carbonyl carbon atom is bonded to a hydrogen forming a "formyl" group or is bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. An acyl group can include 0 to about 12, 0 to about 20, or 0 to about 40 additional carbon atoms bonded to the carbonyl group. An acyl group can include double or triple bonds within the meaning herein. An acryloyl group is an example of an acyl group. An acyl group can also include heteroatoms within the meaning herein. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "cycloalkyl" as used herein refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4-2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "aryl" as used herein refers to cyclic aromatic hydrocarbon groups that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

The term "aralkyl" as used herein refers to alkyl groups as defined herein in which a hydrogen or carbon bond of an alkyl group is replaced with a bond to an aryl group as defined herein. Representative aralkyl groups include benzyl and phenylethyl groups and fused (cycloalkylaryl)alkyl groups such as 4-ethyl-indanyl. Aralkenyl groups are alkenyl groups as defined herein in which a hydrogen or carbon bond of an alkyl group is replaced with a bond to an aryl group as defined herein. The aralkyl group may be attached to the parent structure at any position of the aralkyl group. For example, a C$_7$-aralkyl may attach to the parent structure so as to result in a linked benzyl group (i.e., attached at a non-aromatic carbon) or attached so as to result in a linked toluenyl group (i.e. attached at a aromatic carbon). An example of a C$_7$-aralkyl is benzyl. An example of a C$_8$-aralkyl is phenylethyl. Aralkyl groups may be optionally substituted.

The term "heterocyclyl" as used herein refers to aromatic and non-aromatic ring compounds containing three or more ring members, of which one or more is a heteroatom such as, but not limited to, N, O, and S. Thus, a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a $C_2$-heterocyclyl can be a 5-ring with two carbon atoms and three heteroatoms, a 6-ring with two carbon atoms and four heteroatoms and so forth. Likewise a $C_4$-heterocyclyl can be a 5-ring with one heteroatom, a 6-ring with two heteroatoms, and so forth. The number of carbon atoms plus the number of heteroatoms equals the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups. For example, a dioxolanyl ring and a benzdioxolanyl ring system (methylenedioxyphenyl ring system) are both heterocyclyl groups within the meaning herein. The phrase also includes polycyclic ring systems containing a heteroatom such as, but not limited to, quinuclidyl. Heterocyclyl groups can be unsubstituted, or can be substituted as discussed herein. Heterocyclyl groups include, but are not limited to, pyrrolidinyl, piperidinyl, piperazinyl, morpholinyl, pyrrolyl, pyrazolyl, triazolyl, tetrazolyl, oxazolyl, isoxazolyl, thiazolyl, pyridinyl, thiophenyl, benzothiophenyl, benzofuranyl, dihydrobenzofuranyl, indolyl, dihydroindolyl, azaindolyl, indazolyl, benzimidazolyl, azabenzimidazolyl, benzoxazolyl, benzothiazolyl, benzothiadiazolyl, imidazopyridinyl, isoxazolopyridinyl, thianaphthalenyl, purinyl, xanthinyl, adeninyl, guaninyl, quinolinyl, isoquinolinyl, tetrahydroquinolinyl, quinoxalinyl, and quinazolinyl groups. Representative substituted heterocyclyl groups can be mono-substituted or substituted more than once, such as, but not limited to, piperidinyl or quinolinyl groups, which are 2-, 3-, 4-, 5-, or 6-substituted, or disubstituted with groups such as those listed herein.

The term "heteroaryl" as used herein refers to aromatic ring compounds containing 5 or more ring members, of which, one or more is a heteroatom such as, but not limited to, N, O, and S; for instance, heteroaryl rings can have 5 to about 8-12 ring members. A heteroaryl group is a variety of a heterocyclyl group that possesses an aromatic electronic structure. A heteroaryl group designated as a $C_2$-heteroaryl can be a 5-ring with two carbon atoms and three heteroatoms, a 6-ring with two carbon atoms and four heteroatoms and so forth. Likewise a $C_4$-heteroaryl can be a 5-ring with one heteroatom, a 6-ring with two heteroatoms, and so forth. The number of carbon atoms plus the number of heteroatoms sums up to equal the total number of ring atoms. Heteroaryl groups include, but are not limited to, groups such as pyrrolyl, pyrazolyl, triazolyl, tetrazolyl, oxazolyl, isoxazolyl, thiazolyl, pyridinyl, thiophenyl, benzothiophenyl, benzofuranyl, indolyl, azaindolyl, indazolyl, benzimidazolyl, azabenzimidazolyl, benzoxazolyl, benzothiazolyl, benzothiadiazolyl, imidazopyridinyl, isoxazolopyridinyl, thianaphthalenyl, purinyl, xanthinyl, adeninyl, guaninyl, quinolinyl, isoquinolinyl, tetrahydroquinolinyl, quinoxalinyl, and quinazolinyl groups. Heteroaryl groups can be unsubstituted, or can be substituted with groups as is discussed herein. Representative substituted heteroaryl groups can be substituted one or more times with groups such as those listed herein.

Additional examples of aryl and heteroaryl groups include but are not limited to phenyl, biphenyl, indenyl, naphthyl (1-naphthyl, 2-naphthyl), N-hydroxytetrazolyl, N-hydroxytriazolyl, N-hydroxyimidazolyl, anthracenyl (1-anthracenyl, 2-anthracenyl, 3-anthracenyl), thiophenyl (2-thienyl, 3-thienyl), furyl (2-furyl, 3-furyl), indolyl, oxadiazolyl, isoxazolyl, quinazolinyl, fluorenyl, xanthenyl, isoindanyl, benzhydryl, acridinyl, thiazolyl, pyrrolyl (2-pyrrolyl), pyrazolyl (3-pyrazolyl), imidazolyl (1-imidazolyl, 2-imidazolyl, 4-imidazolyl, 5-imidazolyl), triazolyl (1,2,3-triazol-1-yl, 1,2,3-triazol-2-yl 1,2,3-triazol-4-yl, 1,2,4-triazol-3-yl), oxazolyl (2-oxazolyl, 4-oxazolyl, 5-oxazolyl), thiazolyl (2-thiazolyl, 4-thiazolyl, 5-thiazolyl), pyridyl (2-pyridyl, 3-pyridyl, 4-pyridyl), pyrimidinyl (2-pyrimidinyl, 4-pyrimidinyl, 5-pyrimidinyl, 6-pyrimidinyl), pyrazinyl, pyridazinyl (3-pyridazinyl, 4-pyridazinyl, 5-pyridazinyl), quinolyl (2-quinolyl, 3-quinolyl, 4-quinolyl, 5-quinolyl, 6-quinolyl, 7-quinolyl, 8-quinolyl), isoquinolyl (1-isoquinolyl, 3-isoquinolyl, 4-isoquinolyl, 5-isoquinolyl, 6-isoquinolyl, 7-isoquinolyl, 8-isoquinolyl), benzo[b]furanyl (2-benzo[b]furanyl, 3-benzo[b]furanyl, 4-benzo[b]furanyl, 5-benzo[b]furanyl, 6-benzo[b]furanyl, 7-benzo[b]furanyl), 2,3-dihydro-benzo[b]furanyl (2-(2,3-dihydro-benzo[b]furanyl), 3-(2,3-dihydro-benzo[b]furanyl), 4-(2,3-dihydro-benzo[b]furanyl), 5-(2,3-dihydro-benzo[b]furanyl), 6-(2,3-dihydro-benzo[b]furanyl), 7-(2,3-dihydro-benzo[b]furanyl), benzo[b]thiophenyl (2-benzo[b]thiophenyl, 3-benzo[b]thiophenyl, 4-benzo[b]thiophenyl, 5-benzo[b]thiophenyl, 6-benzo[b]thiophenyl, 7-benzo[b]thiophenyl), 2,3-dihydro-benzo[b]thiophenyl, (2-(2,3-dihydro-benzo[b]thiophenyl), 3-(2,3-dihydro-benzo[b]thiophenyl), 4-(2,3-dihydro-benzo[b]thiophenyl), 5-(2,3-dihydro-benzo[b]thiophenyl), 6-(2,3-dihydro-benzo[b]thiophenyl), 7-(2,3-dihydro-benzo[b]thiophenyl), indolyl (1-indolyl, 2-indolyl, 3-indolyl, 4-indolyl, 5-indolyl, 6-indolyl, 7-indolyl), indazole (1-indazolyl, 3-indazolyl, 4-indazolyl, 5-indazolyl, 6-indazolyl, 7-indazolyl), benzimidazolyl (1-benzimidazolyl, 2-benzimidazolyl, 4-benzimidazolyl, 5-benzimidazolyl, 6-benzimidazolyl, 7-benzimidazolyl, 8-benzimidazolyl), benzoxazolyl (1-benzoxazolyl, 2-benzoxazolyl), benzothiazolyl (1-benzothiazolyl, 2-benzothiazolyl, 4-benzothiazolyl, 5-benzothiazolyl, 6-benzothiazolyl, 7-benzothiazolyl), carbazolyl (1-carbazolyl, 2-carbazolyl, 3-carbazolyl, 4-carbazolyl), 5H-dibenz[b,f]azepine (5H-dibenz[b,f]azepin-1-yl, 5H-dibenz[b,f]azepine-2-yl, 5H-dibenz[b,f]azepine-3-yl, 5H-dibenz[b,f]azepine-4-yl, 5H-dibenz[b,f]azepine-5-yl), 10,11-dihydro-5H-dibenz[b,f]azepine (10,11-dihydro-5H-dibenz[b,f]azepine-1-yl, 10,11-dihydro-5H-dibenz[b,f]azepine-2-yl, 10,11-dihydro-5H-dibenz[b,f]azepine-3-yl, 10,11-dihydro-5H-dibenz[b,f]azepine-4-yl, 10,11-dihydro-5H-dibenz[b,f]azepine-5-yl), and the like.

The term "heterocyclylalkyl" as used herein refers to alkyl groups as defined herein in which a hydrogen or carbon bond of an alkyl group as defined herein is replaced with a bond to a heterocyclyl group as defined herein. Representative heterocyclyl alkyl groups include, but are not limited to, furan-2-yl methyl, furan-3-yl methyl, pyridine-3-yl methyl, tetrahydrofuran-2-yl ethyl, and indol-2-yl propyl.

The term "heteroarylalkyl" as used herein refers to alkyl groups as defined herein in which a hydrogen or carbon bond of an alkyl group is replaced with a bond to a heteroaryl group as defined herein.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include about 1 to about 12, about 1 to about 20, or about 1 to about 40 carbon atoms bonded to the oxygen atom, and can further include double or triple bonds, and can also include heteroatoms. For example, an allyloxy group or a methoxyethoxy group is also an alkoxy group within the meaning herein, as is a methylenedioxy group in a context where two adjacent atoms of a structure are substituted therewith.

The term "amine" as used herein refers to primary, secondary, and tertiary amines having, e.g., the formula N(group)$_3$ wherein each group can independently be H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —NH$_2$, —NHR, —NR$_2$, —NR$_3^+$, wherein each R is independently selected, and protonated forms of each, except for —NR$_3^+$, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "monovalent" as used herein refers to a substituent connecting via a single bond to a substituted molecule. When a substituent is monovalent, such as, for example, F or Cl, it is bonded to the atom it is substituting by a single bond.

The term "hydrocarbon" or "hydrocarbyl" as used herein refers to a molecule or functional group that includes carbon and hydrogen atoms. The term can also refer to a molecule or functional group that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof. Hydrocarbyl groups can be shown as $(C_a-C_b)$hydrocarbyl, wherein a and b are integers and mean having any of a to b number of carbon atoms. For example, $(C_1-C_4)$hydrocarbyl means the hydrocarbyl group can be methyl ($C_1$), ethyl ($C_2$), propyl ($C_3$), or butyl ($C_4$), and $(C_0-C_b)$hydrocarbyl means in certain embodiments there is no hydrocarbyl group.

The term "solvent" as used herein refers to a liquid that can dissolve a solid, liquid, or gas. Non-limiting examples of solvents are silicones, organic compounds, water, alcohols, ionic liquids, and supercritical fluids.

The term "green solvent" as used herein refers to environmentally friendly solvents or biosolvents, which can be derived from processing of agricultural crops. Suitable examples of green solvents include gamma-valerolactone, ethyl lactate, $C_3$-$C_{10}$ diols, $C_2$-$C_{10}$ alcohols, propylene glycol ethers, dimethyl carbonante, acetic acid, levulinic acid, di(ethylene glycol), and 2-methyl tertahydrofuran. In some embodiments, a green solvent can be water.

The term "independently selected from" as used herein refers to referenced groups being the same, different, or a mixture thereof, unless the context clearly indicates otherwise. Thus, under this definition, the phrase "$X^1$, $X^2$, and $X^3$ are independently selected from noble gases" would include the scenario where, for example, $X^1$, $X^2$, and $X^3$ are all the same, where $X^1$, $X^2$, and $X^3$ are all different, where $X^1$ and $X^2$ are the same but $X^3$ is different, and other analogous permutations.

In various embodiments, salts having a positively charged counterion can include any suitable positively charged counterion. For example, the counterion can be ammonium ($NH_4^+$), or an alkali metal such as sodium ($Na^+$), potassium ($K^+$), or lithium ($Li^+$). In some embodiments, the counterion can have a positive charge greater than +1, which can in some embodiments complex to multiple ionized groups, such as $Zn^{2+}$, $Al^{3+}$ or alkaline earth metals such as $Ca^{2+}$ or $Mg^{2+}$.

In various embodiments, salts having a negatively charged counterion can include any suitable negatively charged counterion. For example, the counterion can be a halide, such as fluoride, chloride, iodide, or bromide. In other examples, the counterion can be nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate. The counterion can be a conjugate base of any carboxylic acid, such as acetate or formate. In some embodiments, a counterion can have a negative charge greater than −1, which can in some embodiments complex to multiple ionized groups, such as oxide, sulfide, nitride, arsenate, phosphate, arsenite, hydrogen phosphate, sulfate, thiosulfate, sulfite, carbonate, chromate, dichromate, peroxide, or oxalate.

The term "transition metal complex" as used herein refers to an organic or inorganic complex that includes at least one metal from Group IV, V, or VI in the periodic table.

The term "COD" as used herein refers to 1,5-cyclooctadiene. In various embodiments, COD may additional include a pendant functional group.

The term "lignocellulosic material" or "lignocellulosic biomass" refers to a plant-based composition comprising lignin and cellulose.

In some embodiments, a catalyst comprising a metal-containing bead linked to a transition metal complex is provided. The metal-containing bead can be made of metal, one or more metal alloys, or an inorganic substance that contains a metal, such as a metal oxide or metal nitride. The bead can also be a metal organic framework, such as a zeolite. In some embodiments, the bead includes iron oxide. The iron oxide can be $Fe_2O_3$ or $Fe_3O_4$. In some embodiments, the bead is magnetic. A magnetic bead can be made from any suitable material that is attracted to a magnet, such as iron oxide or a neodymium-containing material such as $Nd_2Fe_{14}B$.

The bead can have an average size of about 0.001 μm to about 100 μm. The average size of the beads corresponds, in some embodiments, to the pore size of pretreated (rendered) cellulose. (Luo et al., 2011) The average size of a bead corresponds to the largest dimension of a bead. In some embodiments, the bead has an average size of about 0.01 μm to about 20 μm, or about 1 μm to about 20 μm. The bead can have an average size of about 0.01 μm, 0.05 μm, 0.1 μm, 0.5 μm, 1 μm, 2 μm, 3 μm, 4 μm, 5 μm, 6 μm, 7 μm, 8 μm, 9 μm, 10 µm, 11 µm, 12 µm, 13 µm, 14 µm, 15 µm, 16 µm, 17 µm, 18 µm, 19 µm, 20 µm, 25 µm, 30 µm, 35 µm, 40 µm, 45 µm, 50 µm, 55 µm, 60 µm, 65 µm, 70 µm, 75 µm, 80 µm, 85 µm, 90 µm, 95 µm, or 100 µm.

In various embodiments, the bead is laser etched. In various embodiments the bead receives a surface modification to increase reactivity, surface area, and/or render the surface more easily functionalized.

In various embodiments, the beads may be of the type obtained from Ferrofluids (Nashua, N.H.), such as EMG 304. EMG 304 is a water-based dispersion of iron oxide particles with dimensions in the range of 5-15 nm. Such beads can be readily functionalized using sol-gel chemistry with a linking group and tethered to an organic compound. (Lu et al. 2002)

In various embodiments, the beads may be of the type typically used in isolating biomolecules. For instance, such beads may be obtained from Bioclone, Inc. (San Diego, Calif.), including any suitable BcMag™ Magnetic Beads. BcMag™ Magnetic Beads are uniform, mono-dispersed, spherical, core-shell superparamagnetic beads which consist of a nanometer-scale superparamagnetic iron oxide core, completely encapsulated by a high purity silica shell.

The beads may also be further functionalized to readily accept a linker. For example, functionalized magnetic beads having the following functional groups are commercially available and may be obtained from Bioclone, Inc. (San Diego, Calif.): beads functionalized with epoxy, vinyl sulfone, thiol or iodoacetlyl (which link to a thiol functional group on the catalyst); beads functionalized with hydrazide or amine (which link to a phosphate or amine functional group of the catalyst); beads functionalized with tosyl, amine, carboxy, epoxy, aldehyde (which link to an amine group on the catalyst). As another example, Avidin-functionalized beads can be used, which will readily accept a biotin-based linker. (Ruffert et al., Ieee Transactions On Magnetics, Vol. 50, No. 11, November 2014).

Catalyst functionalized with a linker can be obtained, e.g., via a method adapted from Y. Lu et al. 2002, Monge-Marcet et al, Tetrahedron 2013, 69, 341-348; or Monge-Marcet et al., Catal. Sci. Technol., 2011, 1, 1544-1563. As an example, such procedure may comprise: mixing a trialkoxysilane having a reactive linking group, e.g., amine, with a compound, e.g., catalyst of formula I, having a suitable counterpart reactive linking group, e.g., thioisocyanate. The resulting functionalized, linked catalyst may be further coupled to magnetic beads for a sol-gel approach, also adapted from Y. Lu et al. 2002.

In some embodiments, at least a portion of the surface of the bead is coated by a surface modifying agent. The surface modifying agent can cover 10%, 20%, 30%, 40%, 50%, 60%, 70%, 80%, 90%, 95%, 98%, 99%, or 100% of the surface of the metal-containing bead. The surface modifying agent can include amorphous silica. In some embodiments, the metal-containing bead is coated with amorphous silica using a sol-gel process. In some embodiments, the amorphous silica uniformly covers the surface of the bead. In various embodiments, the iron oxide beads are modified as described by Lu et al., 2002.

All publications, including non-patent literature (e.g., scientific journal articles), patent application publications, and patents mentioned in this specification are incorporated by reference as if each were specifically and individually indicated to be incorporated by reference.

Catalyst.

The present disclosure provides a nickel complex. In various embodiments the nickel complex can have the structure of Formula I.

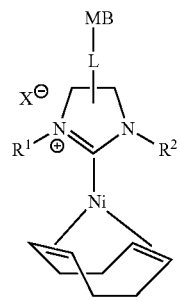

Formula I wherein X is a counterion, MB is a metal-containing bead, L is a linker group which links MB to any portion of the rest of the nickel complex molecule, and R1 and R2 is each independently $C_{1-10}$ alkyl, $C_{7-10}$ aralkyl, $C_6$-$C_{12}$ aryl, or $C_{2-8}$ heterocyclyl, each of which may be optionally substituted.

In various embodiments, $R^1$ and $R^2$ are independently phenyl, unsubstituted or substituted by 1-5 substituents. For example, $R^1$ and $R^2$ are independently:

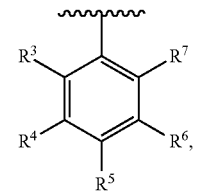

wherein $R^3$, $R^4$, $R^5$, $R^6$ and $R^7$ are each independently selected from H, F, Cl, Br, I, OR, OC(O)N(R)$_2$, CN, NO, $NO_2$, $ONO_2$, azido, $CF_3$, $OCF_3$, alkyl, aryl, cycloalkyl, aralkyl, N(R)$_2$, SR, SOR, $SO_2R$, $NHSO_2R$, $NRSO_2R$, $SO_2N(R)_2$, $SO_3R$, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, $(CH_2)_{0-2}$N(R)C(O)R, $(CH_2)_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, heterocyclyl or heteroaryl, wherein each instance of R can be independently hydrogen or alkyl, cycloalkyl, aryl, or aralkyl. In various embodiments, $R^3$, $R^4$, $R^5$, $R^6$ and $R^7$ are each independently selected from $CF_3$, alkyl, aryl, cycloalkyl or aralkyl. In various embodiments, $R^3$ and $R^7$ are the same. In various embodiments $R^3$ and $R^7$ are other than H.

In various embodiments, $R^1$ and $R^2$ are independently 2,4,6-(Me)$_3$C$_6$H$_2$, 2,6-(iPr)$_2$C$_6$H$_3$, cyclohexyl, tert-butyl or 1-adamantyl, each of which may be unsubstituted or substituted.

In some embodiments, $R^1$ and $R^2$ are each

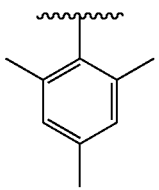

In some embodiments, $R^1$ and $R^2$ are each

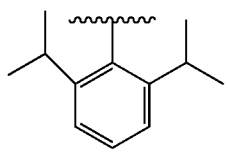

The counterion X can be any suitable monovalent anion, such as halide, carboxylate, alkoxide, and cyanide. The linker L can be any suitable group that can covalently link the complex of Formula I to the metal-containing bead B. The linker L can include from 1 to 500 atoms of H, C, N, O, S, P, F, Cl, or combinations thereof, and can include ether, ester, amide, carbonyl, carboxylate, carbamate, urea, thiourea, thioamide, thio, alkyl, alkenyl, alkynyl, heterocyclyl, heteroaryl and aryl moieties, or combinations of any of these moieties.

In various embodiments, the linker may have the structure:

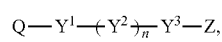

wherein Z is a moiety capable of forming a covalent bond upon reaction with silica, a moiety capable of forming a covalent bond upon reaction with iron oxide, or a moiety resulting from such reaction;
$Y^3$ is a bond, —CO—, —COO—, —OCO—, —CONH—, —NHCO—, —CH$_2$—, —NH—, —O— or —S—.
$Y^2$ is —CH$_2$—, —(CH$_2$)$_m$O—, —(CH$_2$)$_m$O—;
n is an integer between 1 and 20;
m is an integer between 1 and 6;
$Y^1$ is a bond, —CO—, —COO—, —OCO—, —CONH—, —NHCO—, —CSNH—, —NHCS—, —CSO—, —CH$_2$—, —NH—, —O— or —S—; and
Q is a moiety capable of forming a covalent bond upon reaction with a pendant functional group installed on the $R^1$, $R^2$, cyclooctadiene or imidazolinium ring of Formula I, or a moiety resulting from such reaction.

In various embodiments, the linker may have Z is Si(OR)$_3$, wherein R is H, C$_1$-C$_3$ alkyl, or a Si atom linked to a silica solid surface; $Y^3$ is a bond; $Y^2$ is —CH$_2$—; n is an integer between 1 and 5; $Y^1$ is a bond; Q is an isocyanate, a thioisocyanate, a —CSNH— group linked to pendant alcohol or amine group on the nickel-COD-N-heterocyclic carbene complex, a —CONH— group linked to a pendant alcohol or amine group on the nickel-COD-N-heterocyclic carbene complex; —NH$_2$, —OH, an amine linked to a pendant thioamide group on the nickel-COD-N-heterocyclic carbene complex or an oxygen linked to a pendant thioamide group on the nickel-COD-N-heterocyclic carbene complex.

In various embodiments, the linker may have Z is Si(OR)$_3$, wherein R is H, C$_1$-C$_3$ alkyl, or a Si atom linked to a silica solid surface; $Y^3$ is a bond; $Y^2$ is —CH$_2$—; n is an integer between 1 and 5; $Y^1$ is a bond; Q is a carbamate, urea, thiourea, or thiocarbamate.

In some embodiments, the nickel complex can have the structure of Formula II or Formula III:

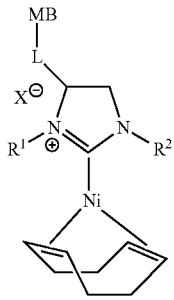

Formula II

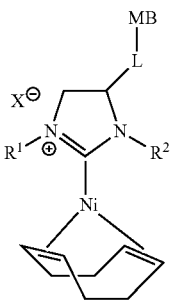

Formula III

In various other embodiments, the nickel complex can have the structure of Formula IIa or Formula IIIa:

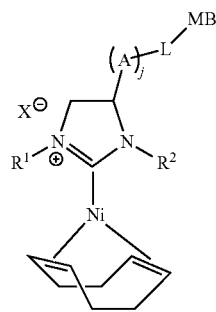

Formula IIa

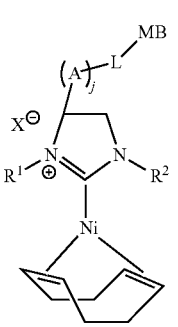

Formula IIIa each of which is defined as in Formula II and III above, except that A is CH$_2$ and j is 1-5; or A is acetyl, propanoyl, butanoyl or pentanoyl and j is 1.

Such compounds of Formula II, IIa, III and IIIa may be obtained selecting or modifying C-4 or C-5 of the imidazolinium to include a pendant functional group capable of reacting with linker L. The C-4 or C-5 may be modified before or after formation of the imidazolinium or before or after complexation of the imidazolinium, nickel and cyclooctadiene. For example, the imidazolinium may be synthesized according to Monge-Marcet et al, 2013 then complexed with nickel and cyclooctadiene. (Monge-Marcet et al, Tetrahedron 2013, 69, 341-348). Other approaches will also be readily understood to a person of sufficient skill in view of the present disclosure. (March's Advanced Organic Chemistry: Reactions, Mechanisms and Structure, 5th ed by M. B. Smith and J. March. Wiley Interscience: New York. 2001. 2112).

In some embodiments, the nickel complex can have the structure of Formula IV or Formula V:

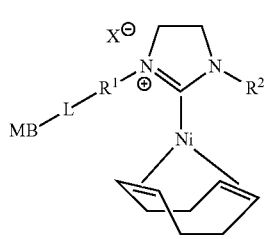

Formula IV

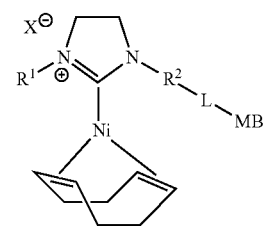

Formula V

Such compounds of Formula IV and V may be obtained selecting or modifying $R^1$ or $R^2$ to include a pendant functional group capable of reacting with linker L. The $R^1$ or $R^2$ may be modified before or after formation of the imidazolinium or before or after complexation of the imidazolinium, nickel and cyclooctadiene. For example, the $R^1$ or $R^2$ can be modified as described in Monge-Marcet et al., 2011. (Monge-Marcet et al., Catal. Sci. Technol., 2011, 1, 1544-1563) Other approaches will also be readily understood to a person of sufficient skill in view of the present disclosure. (March's Advanced Organic Chemistry: Reactions, Mechanisms and Structure, 5th ed by M. B. Smith and J. March. Wiley Interscience: New York. 2001. 2112).

In some embodiments, the nickel complex can have the structure of Formula VI:

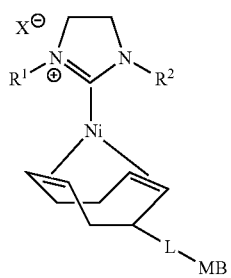

Formula VI

Such compounds of Formula VI may be obtained modifying the cyclooctadiene to include a pendant functional group capable of reacting with linker L. The cyclooctadiene group may be modified before or after of the imidazolinium, nickel and cyclooctadiene. A person of ordinary skill would recognize various approaches to obtaining a cyclooctadiene group having a pendant functional group. (Revell et al., "Synthesis of Functionalized 1,5-Cyclooctadienes by LICKOR Metalation" J. Org. Chem., 2002, 67 (17), pp 6250-6252) Other approaches will also be readily understood to a person of sufficient skill in view of the present disclosure. (March's Advanced Organic Chemistry: Reactions, Mechanisms and Structure, 5th ed by M. B. Smith and J. March. Wiley Interscience: New York. 2001. 2112).

In various embodiments the nickel complex can have the structure of Formula VII:

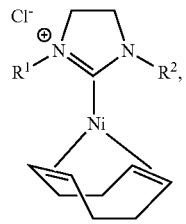

wherein $R^1$ and $R^2$ is each independently phenyl, unsubstituted or substituted by 1-5 substituents. For example, $R^1$ and $R^2$ can be independently:

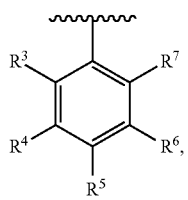

wherein $R^3$, $R^4$, $R^5$, $R^6$ and $R^7$ are each independently selected from H, F, Cl, Br, I, OR, OC(O)N(R)$_2$, CN, NO, NO$_2$, ONO$_2$, azido, CF$_3$, OCF$_3$, alkyl, aryl, cycloalkyl, aralkyl, N(R)$_2$, SR, SOR, SO$_2$R, NHSO$_2$R, NRSO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, heterocyclyl or heteroaryl, wherein each instance of R can be independently hydrogen or alkyl, cycloalkyl, aryl, or aralkyl. In various embodiments, $R^3$, $R^4$, $R^5$, $R^6$ and $R^7$ are each independently selected from CF$_3$, alkyl, aryl, cycloalkyl or aralkyl. In various embodiments, $R^3$ and $R^7$ are the same. In various embodiments $R^3$ and $R^7$ are other than H.

In various embodiments, $R^1$ and $R^2$ is each independently 2,4,6-(Me)$_3$C$_6$H$_2$, 2,6-(iPr)$_2$C$_6$H$_3$, cyclohexyl, tert-butyl or 1-adamantyl, each of which may be unsubstituted or substituted.

The compound of Formula VI may be modified by any methods known in the art so as to be linked, trapped, or otherwise bound to a magnetic solid substrate or magnetic beads.

In various additional embodiments, the catalysts may have a structure according to any of Formulae VII, VIII, IX, X, XI and XII:

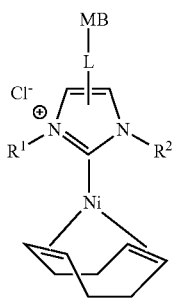

Formula VII

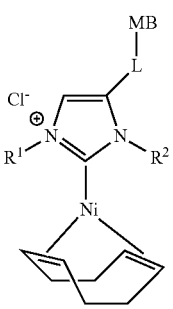

Formula VIII

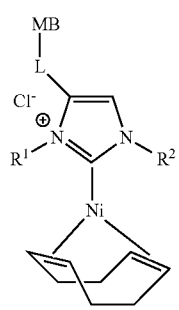

Formula IX

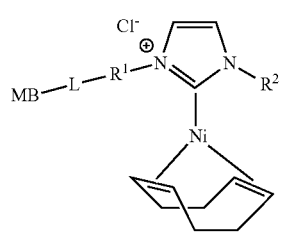

Formula X

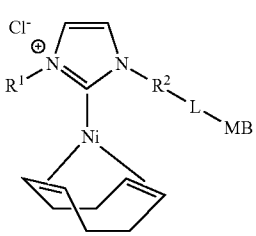

Formula XI

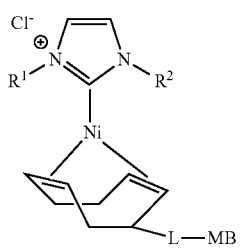

Formula XII

Such compounds may be defined as described for Formula II, III, IV, V and VI herewith. Such compounds may be prepared as discussed herewith for Formula II, III, IV, V and VI and using techniques known in the art. (Monge-Marcet et al, Tetrahedron 2013, 69, 341-348; Monge-Marcet et al., Catal. Sci. Technol., 2011, 1, 1544-1563; March's Advanced Organic Chemistry: Reactions, Mechanisms and Structure, 5$^{th}$ ed by M. B. Smith and J. March. Wiley Interscience: New York. 2001. 2112; Revell et al., J. Org. Chem., 2002, 67 (17), pp 6250-6252).

In various embodiments the catalyst includes a magnetic bead that includes iron oxide and linked to a transition metal complex having the structure of any one of Formulae I-VI.

Method of Fractionation.

The present disclosure also provides a method of fractionation. The method includes treating a cellulose-containing composition, such as wood or another cellulose containing material, with an effective amount of the catalyst to form a fractionated composition. The fractionated composition may be formed under conditions that avoid the degradation of any sugars, such as monosaccharides. The catalyst can retain its catalytic activity with up to a 50% cellulose load, or about a 5%, 10%, 20%, 30%, 40%, or 50% cellulose load.

In various embodiments the cellulose-containing composition is a lignin- and cellulose-containing composition, i.e., a lignocellulosic composition.

The treating step can include chemically fractionating the cellulose-containing composition. In some embodiments, chemical fractionation includes selective cleavage of the β-1,4 glycosidic bonds of cellulose by the transition metal complex. Without being bound by theory, it is believed that the chemical fractionation occurs by binding of the catalyst active site to a cellulose polymer to cleave the β-1,4 glycosidic bonds.

Cellulose polymers are composed of many non-aromatic ethers linked together. The catalysts described herein can depolymerize the cellulose polymers by reacting with the β-1,4-glycosidic linkages in the cellulose polymers, which are the oxygen to carbon bonds that hold the glucose monometers together, resulting in the cleavage of the 1,4-glycosidic linkages.

The treating step can include mechanically fractionating the cellulose-containing composition. The mechanical fractionation can include increasing the accessible surface area and pore size of the cellulose-containing composition. The surface area and pore size are believed to increase as a result of mechanical agitation of the cellulose-containing composition with the catalyst. (Luo et al., 2011) That is, in various embodiments, mechanical fractionation is achieved via mechanical agitation of the composition from the beads. For example, in some embodiments, the beads may physical act upon the cellulose pores to open and expand them, increasing the available surface area of the cellulose-containing composition. Advantageously, the cellulose-containing composition can include a softwood feedstock, rather than high quality and expensive lignin feedstock. Thus, the cellulose-containing composition can include softwood chips, corn stover, or combinations thereof.

In various embodiments, the treating step can include both chemically and mechanically fractionating the cellulose-containing composition.

The fractionation described herein can occur in any suitable green solvent, or mixture of green solvents. In various embodiments, the fractionation described herein can be performed in a green solvent such as levulinic acid, gamma-valerolactone, or mixtures thereof.

In some embodiments, the reaction of any of the catalysts of the present disclosure may proceed according to the following Scheme 1.

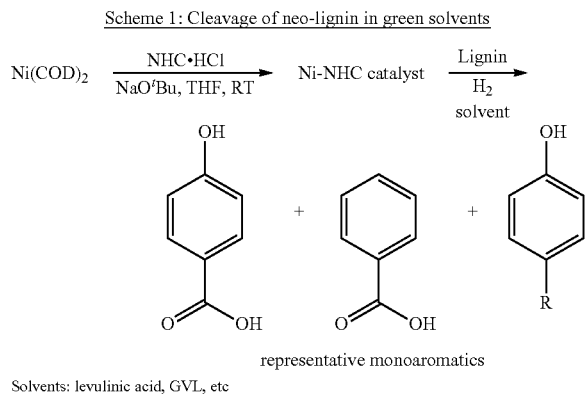

Scheme 1: Cleavage of neo-lignin in green solvents

Solvents: levulinic acid, GVL, etc

In various embodiments, the fractionation method can separate the cellulosic matrix (hemicellulose and cellulose) from the lignin in the cellulose-containing composition by conducting the reaction at temperature and for a time that separates the cellulosic network from lignin network. In some embodiments, the fractionating is performed at a temperature of about 90° C. to about 450° C.

The fractionated composition can be formed at temperatures of about 90° C., 100° C., 110° C., 120° C., 130° C., 140° C., 150° C., 160° C., 170° C., 180° C., 190° C., 200° C., 300° C., 350° C., 400° C., or 450° C., or at any range between these temperatures, in the presence of the catalyst described herein. For example, fractionation can be performed at from 280° C. to 400° C., 300° C. to 380° C., 320° C. to 360° C. Fractionation can be performed at a temperature greater than, less than or about equal to 300° C., 310° C., 320° C., 330° C., 340° C., 350° C., 360° C., 370° C., 380° C., 390° C. or 400° C. The fractionated composition can be formed by reacting a cellulose-containing composition in the presence of the catalyst for about 10 min, 20 min, 30 min, 40 min, 50 min, 60 min, 70 min, 80 min, 90 min, 2 hours, 3 hours, 4 hours, 6 hours, 8 hours, 10 hours, or 12 hours, or any range between these values.

In some embodiments, the method includes magnetically separating a catalyst that includes a metal-containing bead linked to a transition metal complex from the fractionated composition. Magnetically separating the catalyst can include stirring the reaction mixture with one or more magnets in the reaction mixture. The magnetic properties of the catalyst advantageously allow for its separation from the reaction mixture by, for example, attaching to magnets placed into the reaction mixture. The magnet or magnets to which the catalyst attaches to can subsequently be removed from the mixture, and the catalyst physically separated from the magnets. After separation from the reaction mixture, the catalyst can be reused several times without affecting the yield or the rate of conversion of the cellulose to monosaccharides. In some embodiments, the catalyst can be reused 2, 3, 4, 5, or 6 times.

The catalyst can be present in an amount from about 0.0001 wt % to about 2 wt % relative to the weight of cellulose-containing composition. In some embodiments, the catalyst is an amount of about 0.005 wt %, 0.001 wt %, 0.005 wt %, 0.01 wt %, 0.05 wt %, 0.1 wt %, 0.25 wt %, 0.5 wt %, 0.75 wt %, 1 wt %, 1.25 wt %, 1.5 wt %, 1.75 wt %, or 2 wt % relative to the weight of the cellulose-containing composition.

In some embodiments, the fractionating is performed at a pressure of about 1 bar to about 10 bar. In some embodiments, the fractionating is performed at a pressure of about 1 bar, 2 bar, 3 bar, 4 bar, or 5 bar, 6 bar, 7 bar, 8 bar, 9 bar or 10 bar or any range between these values. For example, fractionating may be performed at a pressure between about 4.75 bar to 5.25 bar, 4.5 bar to 5.5 bar, or 4 bar top 6 bar, or 3 bar to 7 bar.

In various embodiments, the fractionating is performed at a pressure of about 1 bar to about 10 bar for about 10 minutes to about 10 hours at a temperature of about 280° C. to about 400° C. In various embodiments, the fractionating is performed at a pressure of about 4 bar to about 6 bar for about 15 minutes to about 7 hours at a temperature of about 300° C. to about 380° C. In various embodiments, the fractionating is performed at a pressure of about 1 bar to about 5 bar for about 1 hour to about 5 hours at a temperature of about 320° C. to about 360° C. In some embodiments, the fractionating is performed at a pressure of about 5 bar for about 1 hour or about 5 hours, at a temperature of about 340° C.

In various embodiments, the fractionating is performed on separated lignin, e.g., as obtained from organsolv or other process which produces quality separated lignin, at a pressure of about 1 bar to about 10 bar for about 10 minutes to about 2 hours at a temperature of about 280° C. to about 400° C. In various embodiments, the fractionating is performed on lignin at a pressure of about 4 bar to about 6 bar for about 15 minutes to about 2 hours at a temperature of about 300° C. to about 380° C. In various embodiments, the fractionating is performed on separated lignin at a pressure of about 1 bar to about 5 bar for about 30 minutes to about 2 hours at a temperature of about 320° C. to about 360° C. In some embodiments, the fractionating is performed on separated lignin at a pressure of about 5 bar for about 1 hour, at a temperature of about 340° C.

In various embodiments, the lignin separation is performed prior to fractionation. The lignin separation is performed on the lignin-containing wood structure at less than, greater than or about equal to 80° C., 90° C., 100° C., 110° C., 120° C., 130° C., 140° C., 150° C., 160° C., 170° C., 180° C., 190° C., 200° C. For example, lignin separation may be performed at between 100° C. and 200° C., between 130° C. and 190° C., or between 150° C. and 170° C. The lignin separation is performed on the lignin-containing wood structure at less than, greater than or about equal to 80° C., 90° C., 100° C., 110° C., 120° C., 130° C., 140° C., 150° C., 160° C., 170° C., 180° C., 190° C., 200° C. For example, lignin separation may be performed for about 5, about 10, about 15 or about 20 minutes.

In various embodiments, the lignin separation is performed in the same step as fractionation. The lignin separation and fractionation are performed on the wood directly at a temperature about 90° C., 100° C., 110° C., 120° C., 130° C., 140° C., 150° C., 160° C., 170° C., 180° C., 190° C., 200° C., 300° C., 350° C., 400° C., or 450° C., or at any range between these temperatures, in the presence of the catalyst described herein. For example, fractionation can be performed at from 280° C. to 400° C., 300° C. to 380° C., 320° C. to 360° C. Fractionation can be performed at a temperature greater than, less than or about equal to 300° C., 310° C., 320° C., 330° C., 340° C., 350° C., 360° C., 370° C., 380° C., 390° C. or 400° C. The lignin separation and fractionation are performed on the wood directly at a pressure about 1 bar, 2 bar, 3 bar, 4 bar, or 5 bar, 6 bar, 7 bar, 8 bar, 9 bar or 10 bar or any range between these values. For example, fractionating may be performed at a pressure between about 4.75 bar to 5.25 bar, 4.5 bar to 5.5 bar, or 4 bar top 6 bar, or 3 bar to 7 bar. The lignin separation and fractionation are performed on the wood directly at a pressure about 1 bar, 2 bar, 3 bar, 4 bar, or 5 bar, 6 bar, 7 bar, 8 bar, 9 bar or 10 bar or any range between these values. For example, fractionating may be performed at a pressure between about 4.75 bar to 5.25 bar, 4.5 bar to 5.5 bar, or 4 bar top 6 bar, or 3 bar to 7 bar. The lignin separation and fractionation are performed on the wood directly for about or at least 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295 or 300 minutes and/or no more than 300 minutes.

The lignin separation and fractionation are performed at a pressure of about 1 bar to about 10 bar for about 10 minutes to about 5 hours at a temperature of about 280° C. to about 400° C. In various embodiments, the fractionating is performed at a pressure of about 4 bar to about 6 bar for about 15 minutes to about 5 hours at a temperature of about 300° C. to about 380° C. In various embodiments, the fractionating is performed at a pressure of about 1 bar to about 5 bar for about 30 minutes to about 5 hours at a temperature of about 320° C. to about 360° C. In some embodiments, the fractionating is performed at a pressure of about 5 bar for at least 30 minutes about 5 hours or less, at a temperature of about 340° C.

The fractionated composition includes a liquid phase and a solid phase. The solid phase can include lignin. The liquid phase can include monosaccharides. In some embodiments, the yield of monosaccharides based on the weight of the cellulose-containing composition can be 5%, 10%, 15%, 20%, 25%, 30%, 35%, 40%, 45%, 50%, 55%, 60%, 65%, 70%, 75%, 80%, 85%, 95%, or 99%, or any range between these values.

In some embodiments, the production of monosaccharides proceeds according to Scheme 2.

Scheme 2

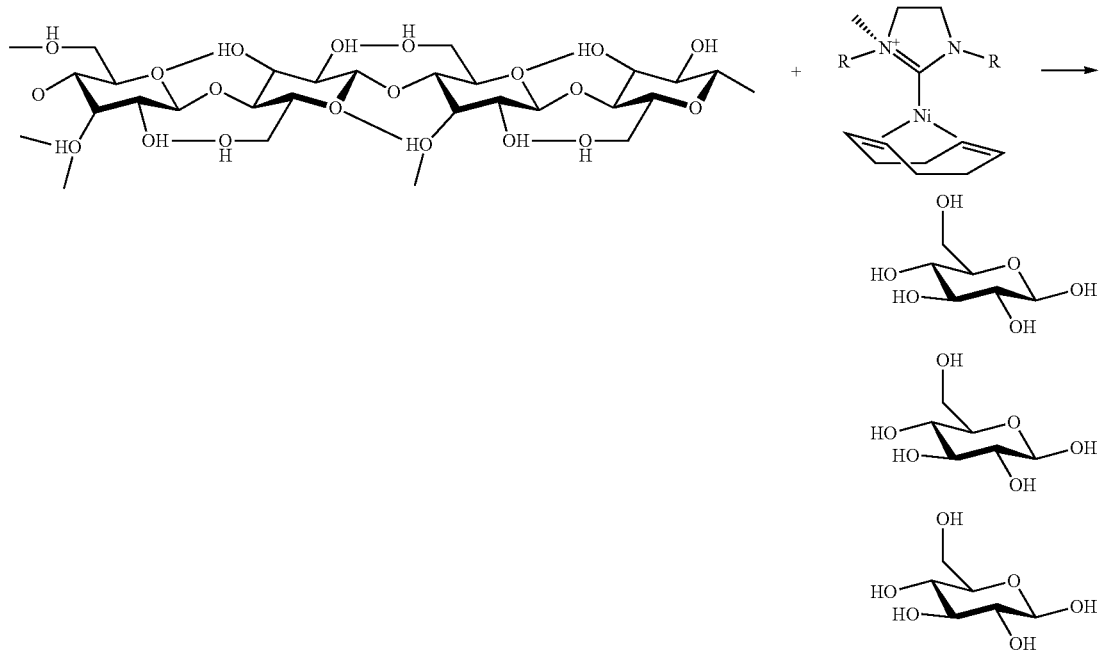

In various embodiments, the method includes addition of hydrogen gas (H$_2$) to produce the fractionated composition.

In some embodiments, a method of wood fractionation includes mechanically and chemically fractionating a cellulose-containing composition with a catalyst to produce a fractionated composition having a liquid phase comprising monosaccharides and a solid phase, wherein the chemical fractionation includes selective cleavage of the β-1,4 glycosidic bonds of cellulose by the transition metal complex, the mechanical fractionation includes increasing the accessible surface area and pore size of the cellulose-containing composition; and magnetically separating the catalyst from the fractionated composition. The mechanical fractionation can include increasing the accessible surface area and pore size of the cellulose-containing composition, e.g., by mechanical agitation of the composition from the beads. (Luo et al., 2011) The surface area and pore size are believed to increase as a result of mechanical agitation of the cellulose-containing composition with the catalyst.

In some embodiments, a method of making a transition metal complex is provided. The method includes reacting

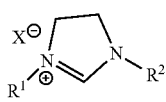

with a transition metal precursor in the presence a strong base and solvent to form a N-heterocyclic carbene complex. The method can also include reacting, e.g.,

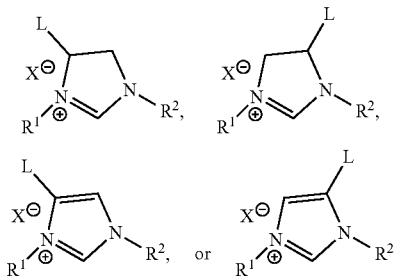

in the presence a strong base and solvent to form a N-heterocyclic carbene carbene complex.

The strong base can be an alkali metal alkoxide, such as sodium t-butoxide. The strong base can also be an alkali metal salt of an amine, such as lithium diisopropyl amide (LDA), or an organolithium reagent such as butyllithium.

The solvent can be any suitable non-polar aprotic solvent, such toluene or xylene.

The transition metal precursor can be a Ni(0) (nickel in the zero oxidation state) complex, such as Ni(COD)$_2$.

EXAMPLES

Various embodiments of the present invention can be better understood by reference to the following Examples which are offered by way of illustration. The present invention is not limited to the Examples given herein.

Synthesis of Nickel Catalyst

The below synthetic steps can be used to provide a newly synthesized solid catalyst, according to some embodiments.

Step 1: An aromatic amine, where R=2,4,6-trimethylaniline or 2,6-diisopropylaniline, can be reacted with oxalic acid in a glyoxal linking reaction in methanol solvent for 6 h at 25° C. to form a diamine.

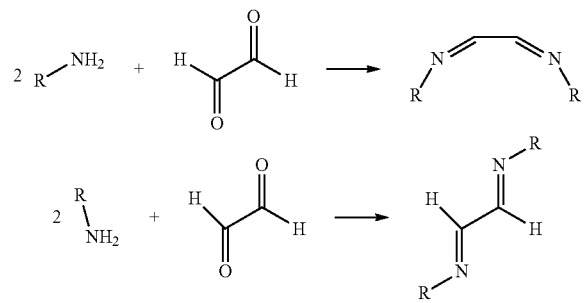

Step 2: The diimine from Step 1 is contacted with hydrochloric acid to form a salt.

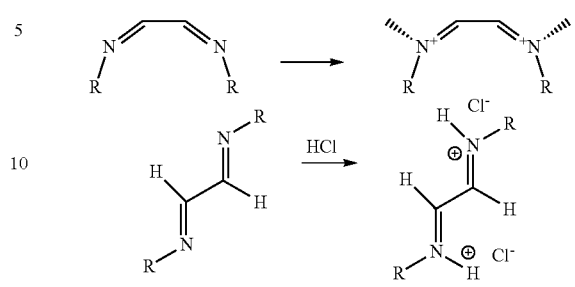

Step 3: Forming the ring structure: Stirred and refluxed at 110° C. for 16 hours under an argon atmosphere.

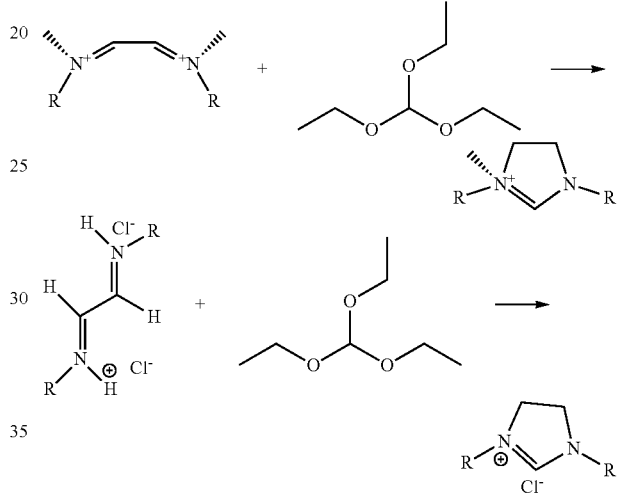

Step 4: The product is washed once with cold diethyl ether and once with cold ethyl acetate.

Step 5: The transition metal complex is synthesized by Ni(COD)$_2$ with 2.5 equivalents of sodium-t-butoxide in m-xylene.

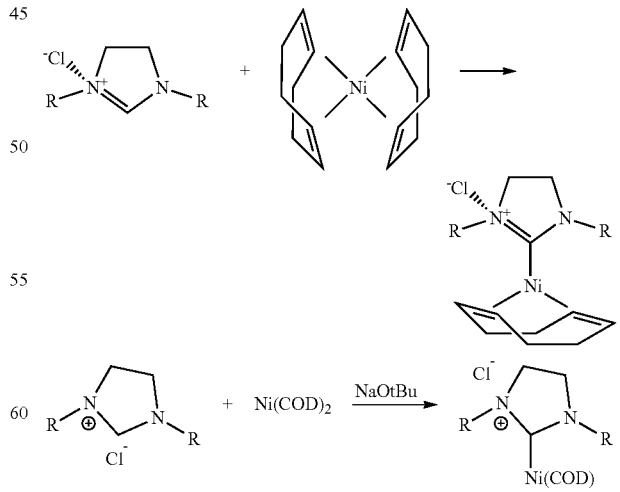

Such compound is further derivatized to contain a functional group which will react with a linker functional group. For example, using synthetic approaches and techniques known in the art. (Monge-Marcet et al, Tetrahedron 2013, 69, 341-348; Monge-Marcet et al., Catal. Sci. Technol., 2011, 1, 1544-1563; March's Advanced Organic Chemistry: Reactions, Mechanisms and Structure, 5$^{th}$ ed by M. B. Smith and J. March. Wiley Interscience: New York. 2001. 2112; Revell et al., J. Org. Chem., 2002, 67 (17), pp 6250-6252).

The functionalized compound is linked to magnetic beads as described in Lu et al. 2002, which is incorporated by reference herewith, and using EMG 304 beads obtained from Ferrofluids (Nashua, N.H.).

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

ENUMERATED EMBODIMENTS

The following exemplary embodiments are provided, the numbering of which is not to be construed as designating levels of importance:

Embodiment 1 provides a catalyst having the structure:

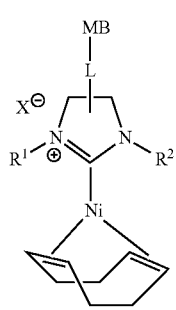

Formula I wherein
X is a counterion;
L is a linker group;
MB is a magnetic metal-containing bead; and
$R^1$ and $R^2$ are each independently chosen from $C_{1-10}$ alkyl, $C_{7-10}$ aralkyl, $C_6$-$C_{12}$ aryl, or $C_{2-8}$ heterocyclyl, each of which may be optionally substituted.

Embodiment 2 provides the catalyst of embodiment 1, wherein the bead comprises iron oxide.

Embodiment 3 provides the catalyst of any one of embodiments 1-2, wherein the bead has an average size of about 0.001 µm to about 100 µm.

Embodiment 4 provides the catalyst of any one of embodiments 1-3, wherein at least a portion of the surface of the bead is coated by amorphous silica.

Embodiment 5 provides the catalyst of any one of embodiments 1-4, wherein the linker comprises a silane on one terminal end which covalently binds to the silica surface of the meta-containing bead.

Embodiment 6 provides the catalyst of any one of embodiments 1-5, wherein the linker comprises a functional group on one terminal end which covalently binds to the functional group furnished on the remainder of the molecule.

Embodiment 7 provides the catalyst of any one of embodiments 1-6, wherein the linker is attached according to the structure:

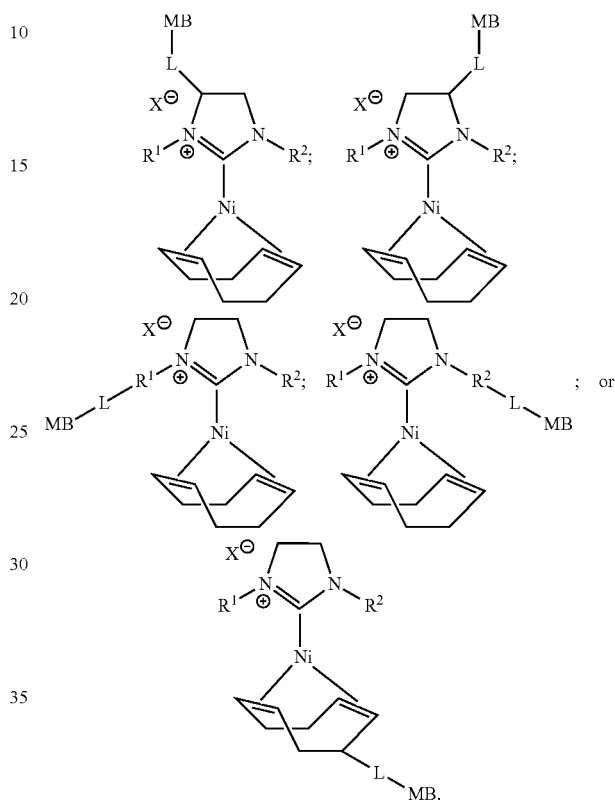

Embodiment 8 provides the catalyst of any one of embodiments 1-7, wherein the linker is attached to the surface or silica surface of the meta-containing bead by a siloxane linkage and attached to the remaining portion of the catalyst molecule via carbamate, urea, thiocarbamate, thiourea, amide or ester linkage.

Embodiment 9 provides the catalyst of any one of embodiments 1-8, wherein $R^1$ and $R^2$ are each independently

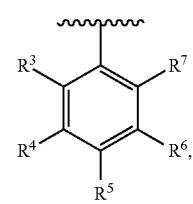

wherein $R^3$, $R^4$, $R^5$, $R^6$ and $R^7$ are each independently H, $C_1$-$C_{10}$ alkyl, wherein at least a portion of the surface of the bead is uniformly coated with amorphous silica.

Embodiment 10 provides the catalyst of any one of embodiments 1-9, wherein $R^1$ and $R^2$ are Embodiment 11 provides the catalyst of any one of embodiments 1-9, wherein $R^1$ and $R^2$ are

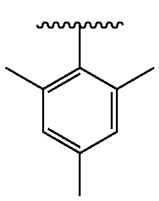

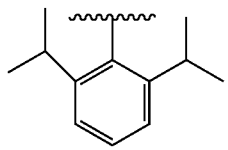

Embodiment 12 provides a method of fractionation, comprising:

treating a lignocellulosic feedstock with an effective amount of a catalyst immobilized on a solid magnetic support, wherein the catalyst comprises a nickel coordinated to a cyclooctadiene ligand and an n-heterocyclic carbene; and heating the treated lignocellulosic feedstock under pressure.

Embodiment 13 provides the method of embodiment 12, wherein the catalyst has the structure of any one of Embodiments 1-12 or has the structure of Formula I:

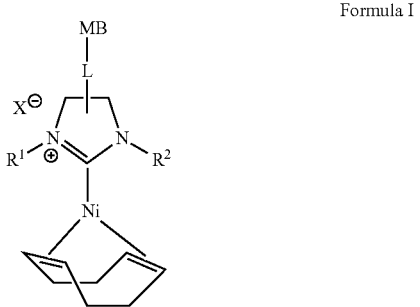

Formula I wherein
X is a counterion;
L is a linker group;
MB is a metal-containing solid bead support; and
$R^1$ and $R^2$ is each independently $C_{1-10}$ alkyl, $C_{7-10}$ aralkyl, $C_6$-$C_{12}$ aryl, or $C_{2-8}$ heterocyclyl, each of which may be optionally substituted.

Embodiment 14 provides the method of any one of embodiments 12-13, wherein the treating comprises mechanical and chemical degradation of the lignocellulosic feedstock.

Embodiment 15 provides the method of embodiment 14, wherein the chemical degradation comprises selective cleavage of the β-1,4 glycosidic bonds of cellulose by the transition metal complex.

Embodiment 16 provides the method of any one of embodiments 14-15, wherein the mechanical degradation is due to mechanical abrasion of the lignocellulosic feedstock by the solid support.

Embodiment 17 provides the method of any one of embodiments 14-16, wherein the mechanical degradation results in increased pore size and increased reactive surface area of the lignocellulosic feedstock.

Embodiment 18 provides the method of any one of embodiments 12-17, wherein the lignocellulosic composition comprises softwood chips, corn stover, or a combination thereof.

Embodiment 19 provides the method of any one of embodiments 12-18, further comprising magnetically separating the catalyst from the fractionated composition.

Embodiment 20 provides the method of any one of embodiments 12-19, wherein separation of lignin and fractionation is performed simultaneously in a single heating step.

Embodiment 21 provides a method of wood fractionation, comprising:

mechanically and chemically fractionating a cellulose-containing composition with a catalytic amount of the catalyst of any one of embodiment 1-11 to produce a fractionated composition having a liquid phase comprising monosaccharides and a solid phase, wherein the chemical fractionation comprises selective cleavage of the β-1,4 glycosidic bonds of cellulose by the transition metal complex, the mechanical fractionation comprises increasing the accessible surface area and pore size of the cellulose-containing composition; and magnetically separating the catalyst from the fractionated composition.

Embodiment 22 provides a method of fractionation, comprising:

treating a lignocellulosic feedstock with the catalyst of any one of embodiments 1-11; and heating the treated lignocellulosic feedstock under pressure.

Embodiment 23 provides the method of any one of embodiments 12-22, wherein the fractionating is performed at a temperature of about 300° C. to 400° C., at a pressure between 1 and 10 bar, for 5 hours or less.

Embodiment 24 provides the method of any one of embodiments 12-23, wherein the method is for wood fractionation.

Embodiment 25 provides the method of any one of embodiments 12-24, wherein the catalytic amount of the composition of embodiments 1 is from about 0.0001 wt % to about 2 wt % relative to the weight of the cellulose-containing composition.

Embodiment 26 provides the method of any one of embodiments 12-25, wherein the fractionating is performed at a temperature of about 90° C. to about 450° C.

Embodiment 27 provides the method of any one of embodiments 12-26, wherein the fractionating is performed at a pressure of about 1 bar to about 10 bar.

Embodiment 28 provides the method of any one of embodiments 12-27, wherein the fractionated composition comprises a liquid phase and a solid phase.

Embodiment 29 provides the method of any one of embodiments 12-28, wherein the liquid phase comprises monosaccharides.

REFERENCES

Each of the following references are hereby incorporated by reference in their entireties:
1. RFA, *Fueling a high octane future*. 2016, Renewable Fuels Association: on the world wide web at: ethanolrfa.org/wp-content/uploads/2016/02/RFA_2016_full_final.pdf.
2. Li, H., et al., *Efficient valorization of biomass to biofuels with bifunctional solid catalytic materials*. Progress in Energy and Combustion Science, 2016. 55: p. 98-194.
3. Hu, L., et al., *Chemocatalytic hydrolysis of cellulose into glucose over solid acid catalysts*. Applied Catalysis B: Environmental, 2015. 174-175: p. 225-243.
4. Schneider, L., et al., *Solid acid-catalyzed depolymerization of barley straw driven by ball milling*. Bioresource Technology, 2016. 206: p. 204-210.
5. Rinaldi, R., et al., *Which controls the depolymerization of cellulose in ionic liquids: The solid acid catalyst or cellulose?* ChemSusChem, 2010. 3(2): p. 266-276.
6. Onda, A., T. Ochi, and K. Yanagisawa, *Selective hydrolysis of cellulose into glucose over solid acid catalysts*. Green Chemistry, 2008. 10(10): p. 1033-1037.
7. Zhang, C., et al., *Biochar sulfonic acid immobilized chlorozincate ionic liquid: an efficiently biomimetic and reusable catalyst for hydrolysis of cellulose and bamboo under microwave irradiation*. Cellulose, 2014. 21(3): p. 1227-1237.
8. Verma, D., R. Tiwari, and A. K. Sinha, *Depolymerization of cellulosic feedstocks using magnetically separable functionalized graphene oxide*. RSC Advances, 2013. 3(32): p. 13265-13272.
9. Xiong, Y., et al., *Hydrolysis of cellulose in ionic liquids catalyzed by a magnetically-recoverable solid acid catalyst*. Chemical Engineering Journal, 2014. 235: p. 349-355.
10. Shuai, L. and X. Pan, *Hydrolysis of cellulose by cellulase-mimetic solid catalyst*. Energy & Environmental Science, 2012. 5(5): p. 6889-6894.
11. Alonso, D. M., S. G. Wettstein, and J. A. Dumesic, *Gamma-valerolactone, a sustainable platform molecule derived from lignocellulosic biomass*. Green Chemistry, 2013. 15(3): p. 584-595.
12. Luo, X. et al., *Effects of drying-induced fiber hornification on enzymatic saccharification of lignocelluloses*. Enzyme and microbial technology, 2011. 48(1): p. 92-99.
13. Lu, Y., et al., *Modifying the surface properties of superparamagnetic iron oxide nanoparticles through a sol-gel approach*. Nano letters, 2002. 2(3): p. 183-186.
14. Ruffert, C, et al., *Investigations on the Separation of Platinum Nanoparticles With Magnetic Beads* Ieee Transactions On Magnetics, Vol. 50, No. 11, November 2014
15. Monge-Marcet, A. et al., *Imidazolium-derived organosilicas for catalytic applications*, Catal. Sci. Technol., 2011, 1, 1544-1563
16. Revell, J. D., et al., *Synthesis of Functionalized 1, 5-Cyclooctadienes by LICKOR Metalation* J. Org. Chem., 2002, 67 (17), pp 6250-6252
17. Monge-Marcet, A., et al, *Catalytic applications of recyclable silica immobilized NHC-ruthenium complexes*, Tetrahedron 2013, 69, 341-348
18. *March's Advanced Organic Chemistry: Reactions, Mechanisms and Structure*, 5th ed by M. B. Smith and J. March. Wiley Interscience: New York. 2001. 2112;

What is claimed is:

1. A catalyst having the structure:

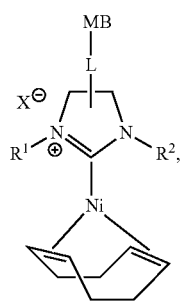

Formula I wherein X is a counterion;
L is a linker group;
MB is a magnetic metal-containing bead; and
$R^1$ and $R^2$ is each $C_{1-10}$ alkyl, $C_{7-10}$ aralkyl, $C_6$-$C_{12}$ aryl, or $C_{2-8}$ heterocyclyl, each of which is optionally substituted.

2. The catalyst of claim 1, wherein the magnetic metal-containing bead comprises iron oxide.

3. The catalyst of claim 1, wherein the magnetic metal-containing bead has an average size of 0.001 micrometer to 100 micrometer.

4. The catalyst of claim 1, wherein 10% to 100% of the surface of the magnetic metal-containing bead is coated by amorphous silica.

5. The catalyst of claim 4, wherein the linker comprises a silane on one terminal end which covalently binds to the silica surface of the magnetic metal-containing bead.

6. The catalyst of claim 5, wherein the linker is attached to the silica surface of the magnetic metal-containing bead by a siloxane linkage and attached to the remaining portion of the catalyst molecule via carbamate, urea, thiocarbamate, thiourea, amide or ester linkage.

7. The catalyst of claim 1, wherein the linker comprises a functional group on one terminal end which binds to a functionalized surface of the magnetic metal-containing bead, so as to covalently link the magnetic metal-containing bead to the remainder of the catalyst.

8. The catalyst of claim 1, wherein the linker is attached according to the structure:

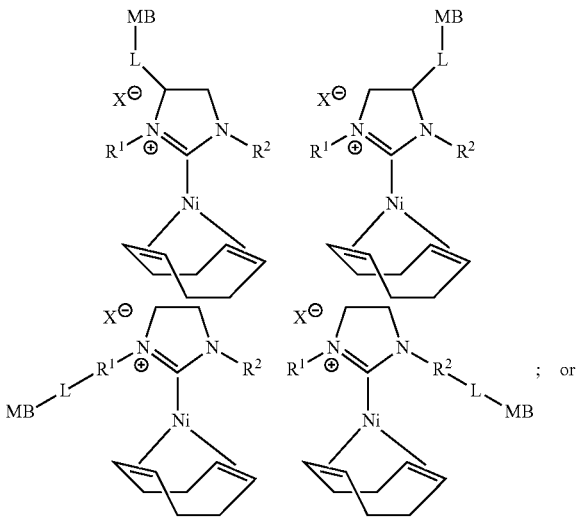

-continued

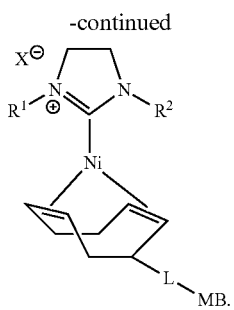

9. The catalyst of claim 1, wherein R¹ and R² are each independently

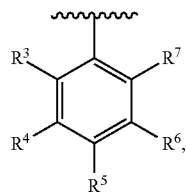

wherein R³, R⁴, R⁵, R⁶ and R⁷ are each independently H, $C_1$-$C_{10}$ alkyl.

10. The catalyst of claim 9, wherein R¹ and R² are

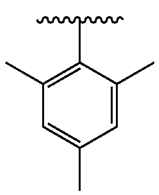

11. The catalyst of claim 9, wherein R¹ and R² are

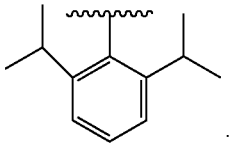 [SMILES: *c1c(C(C)C)cccc1C(C)C]

12. The catalyst of claim 1, wherein the linker comprises a silane, thiol, phosphate, amine, or biotin.

13. The catalyst of claim 12, wherein the silane is a siloxane.

14. The catalyst of claim 1, wherein the linker comprises a silane, thiol, phosphate, amine, or biotin which is attached to a functionalized surface of the magnetic metal-containing bead, and the linker further comprises a carbamate, urea, thiocarbamate, thiourea, amide or ester on another terminal end which covalently links to the remainder of the catalyst.

15. The catalyst of claim 1, wherein the magnetic metal-containing bead is surface functionalized with one or more of an epoxy, vinyl sulfone, thiol, iodoacetlyl, hydrazide, tosyl, amine, carboxy, epoxy, aldehyde, avidin, or amorphous silica.

16. The catalyst of claim 15, wherein the magnetic metal-containing bead is surface functionalized with amorphous silica and the linker comprises a silane.

17. The catalyst of claim 15, wherein the magnetic metal-containing bead is surface functionalized with epoxy, vinyl sulfone, thiol or iodoacetlyl, and the linker comprises a thiol.

18. The catalyst of claim 15, wherein the magnetic metal-containing, bead is surface functionalized with tosyl, amine, carboxy, epoxy, aldehyde, and the linker comprises an amine.

19. The catalyst of claim 15, wherein the magnetic metal-containing bead is surface functionalized with hydrazide or amine, and the linker comprises a phosphate or amine.

20. The catalyst of claim 15, wherein the magnetic metal-containing bead is surface functionalized with Avidin, and the linker comprises a biotin.

* * * * *

UNITED STATES PATENT AND TRADEMARK OFFICE
CERTIFICATE OF CORRECTION

Page 1 of 1

PATENT NO. : 11,077,435 B2
APPLICATION NO. : 16/928673
DATED : August 3, 2021
INVENTOR(S) : Alkasrawi et al.

It is certified that error appears in the above-identified patent and that said Letters Patent is hereby corrected as shown below:

On the Title Page

Column 2, item [56], Line 13, delete "NHCeruthenium" and insert --NHC-ruthenium-- therefor In the Claims Column 32, Line 33, Claim 18, delete "metal-containing," and insert --metal-containing-- therefor Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*